(12) United States Patent
Zhang et al.

(10) Patent No.: US 10,798,302 B2
(45) Date of Patent: Oct. 6, 2020

(54) METHOD OF CAPTURING BASED ON USAGE STATUS OF ELECTRONIC DEVICE AND RELATED PRODUCTS

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/180,369

(22) Filed: Nov. 5, 2018

(65) Prior Publication Data

US 2019/0199925 A1    Jun. 27, 2019

(30) Foreign Application Priority Data

Dec. 25, 2017 (CN) .......................... 2017 1 1424633

(51) Int. Cl.
  *H04N 5/225* (2006.01)
  *H04N 5/232* (2006.01)
  *H04M 1/725* (2006.01)
(52) U.S. Cl.
  CPC .... *H04N 5/23245* (2013.01); *H04M 1/72569* (2013.01); *H04N 5/23296* (2013.01)
(58) Field of Classification Search
  CPC .................. H04N 1/00183; H04N 5/23222
  See application file for complete search history.

(56) References Cited

U.S. PATENT DOCUMENTS

2009/0256933 A1* 10/2009 Mizukami .......... G06K 9/00255
                                                      348/240.1
2010/0150450 A1    6/2010 Tsuji
             (Continued)

FOREIGN PATENT DOCUMENTS

CN         102043942 A      5/2011
CN         103856705 A      6/2014
             (Continued)

OTHER PUBLICATIONS

International search report issued in corresponding international application No. PCT/CN2018/112691 dated Jan. 30, 2019.
             (Continued)

*Primary Examiner* — Twyler L Haskins
*Assistant Examiner* — Dwight Alex C Tejano (57) ABSTRACT

A capturing method and related products are provided. The capturing method is applicable to an electronic device including a gravity sensor, a display screen, a control circuit, and a camera. The display screen has a display region and a non-display region. The camera is located in the non-display region. The method includes the follows. A usage status of the electronic device is determined. The usage status includes a portrait-mode-upright usage status and a portrait-mode-inverted usage status. The non-display region is located at the top side of the display region when the electronic device is in the portrait-mode-upright usage status. A target zoom ratio of the camera is determined when the electronic device is in the portrait-mode-inverted usage status. An image is captured based on the target zoom ratio when the electronic device is in the portrait-mode-inverted usage status.

12 Claims, 8 Drawing Sheets

(56) References Cited

U.S. PATENT DOCUMENTS

| | | | |
|---|---|---|---|
| 2013/0203462 A1* | 8/2013 | Tahk | G06F 3/04845 455/556.1 |
| 2014/0118600 A1* | 5/2014 | Son | H04N 5/23293 348/333.11 |
| 2014/0139724 A1 | 5/2014 | Yasuda | |
| 2014/0192217 A1* | 7/2014 | Kim | H04N 5/23293 348/222.1 |
| 2014/0362257 A1* | 12/2014 | Viljamaa | H04N 5/2251 348/231.99 |
| 2015/0029347 A1 | 1/2015 | Tsubusaki | |
| 2015/0074589 A1 | 3/2015 | Pan et al. | |
| 2015/0117833 A1* | 4/2015 | Chen | H04R 5/04 386/227 |
| 2015/0334292 A1* | 11/2015 | Tartz | G08B 6/00 348/222.1 |
| 2015/0358498 A1* | 12/2015 | Eom | H04N 5/23222 348/231.99 |
| 2017/0104938 A1 | 4/2017 | Shimosato | |
| 2017/0270348 A1* | 9/2017 | Morgana | G06K 9/00255 |
| 2018/0255237 A1* | 9/2018 | Salem | G06T 7/74 |
| 2018/0376072 A1* | 12/2018 | Kwon | H04N 5/23222 |

FOREIGN PATENT DOCUMENTS

| | | |
|---|---|---|
| CN | 104202476 A | 12/2014 |
| CN | 104363386 A | 2/2015 |
| CN | 104902170 A | 9/2015 |
| CN | 106488126 A | 3/2017 |
| CN | 106909274 A | 6/2017 |
| CN | 107181913 A | 9/2017 |
| CN | 107357540 A | 11/2017 |
| EP | 2814234 A1 | 12/2014 |
| EP | 3119077 A1 | 1/2017 |

OTHER PUBLICATIONS

Extended European search report issued in corresponding European application No. 18204233.3 dated Apr. 8, 2019.

Examination report issued in corresponding IN application No. 201814040819 dated Jun. 30, 2020.

Communication pursuant to Article 94(3) EPC issued in corresponding European application No. 18204233.3 dated May 25, 2020.

* cited by examiner

METHOD OF CAPTURING BASED ON USAGE STATUS OF ELECTRONIC DEVICE AND RELATED PRODUCTS

CROSS-REFERENCE TO RELATED APPLICATION(S)

This application claims priority to Chinese Patent Application No. 201711424633.5, filed on Dec. 25, 2017, the content of which is hereby incorporated by reference in its entirety.

TECHNICAL FIELD

This disclosure relates to the technical field of electronic devices, and particularly to a capturing method and related products.

BACKGROUND

With the popularization of smart phones, the smart phone can support more and more applications and become more powerful. The smart phone develops towards diversification and individuation, and has become essential electronic products in users' lives.

Taking photos with mobile phones has become a preferred way for people to take pictures in daily life. The camera of the mobile phone is close to a level of a professional camera, and the pixel, focus, exposure settings and other aspects have reached a certain level of professionalism.

SUMMARY

Implementations of the present disclosure provide a capturing method and related products.

According to a first aspect of the implementations of the present disclosure, a capturing method is provided. The capturing method is applicable to an electronic device including a gravity sensor, a display screen, a control circuit, and a camera. The display screen has a display region and a non-display region. The camera is located in the non-display region. The method includes the follows.

A usage status of the electronic device is determined. The usage status is configured to indicate a gesture of the electronic device when the electronic device is held. The usage status includes a portrait-mode-upright usage status and a portrait-mode-inverted usage status. The non-display region is located at the top side of the display region when the electronic device is in the portrait-mode-upright usage status. A target zoom ratio of the camera is determined when the electronic device is in the portrait-mode-inverted usage status. An image is captured based on the target zoom ratio when the electronic device is in the portrait-mode-inverted usage status.

According to a second aspect of the implementations of the present disclosure, an electronic device is provided. The electronic device includes a processor and a memory configured to store executable program codes which, when executed, cause the processor to: determine a usage status of the electronic device, the usage status being configured to indicate a gesture of the electronic device when the electronic device is held, the usage status comprising a portrait-mode-upright usage status and a portrait-mode-inverted usage status, and a non-display region being located at the top side of a display region when the electronic device is in the portrait-mode-upright usage status; determine a target zoom ratio of a camera when the electronic device is in the portrait-mode-inverted usage status; capture an image based on the target zoom ratio when the electronic device is in the portrait-mode-inverted usage status.

According to a third aspect of the implementations of the disclosure, a non-transitory computer readable storage medium is provided. The non-transitory computer readable storage medium is configured to store a computer program which, when executed by a processor, causes the processor to carry out following actions: determining a usage status of an electronic device, the usage status being configured to indicate a gesture of the electronic device when the electronic device is held, the usage status comprising a portrait-mode-upright usage status and a portrait-mode-inverted usage status, and a non-display region being located at the top side of a display region when the electronic device is in the portrait-mode-upright usage status; determining a target zoom ratio of a camera when the electronic device is in the portrait-mode-inverted usage status; capturing an image based on the target zoom ratio when the electronic device is in the portrait-mode-inverted usage status.

BRIEF DESCRIPTION OF THE DRAWINGS

In order to illustrate technical solutions of implementations of the present disclosure more clearly, the drawings used in the implementations will be briefly described below. It will be apparent that the drawings described in the following are merely some implementations of the present disclosure, and it will be apparent to those skilled in the art that other drawings can be obtained from the drawings without any creative work.

DETAILED DESCRIPTION

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

In order to understand the capturing method and related products provided in implementations of the present disclosure, the following are described in detail.

The electronic device involved in the implementations of the present disclosure may include various handheld devices, in-vehicle devices, wearable devices, computing devices or other processing devices connected to the wireless modem, as well as various forms of user equipments (UE), mobile stations (MS), terminal devices, and the like. For the convenience of description, the above-mentioned devices are collectively referred to as an electronic device.

Implementations of the present disclosure provide a capturing method and related products, which can adaptively match a zoom ratio of a camera according to a usage status of an electronic device and improve the capturing intelligence and the capturing effect.

According to a first aspect of the implementations of the present disclosure, an electronic device is provided. The electronic device includes a gravity sensor, a display screen, a control circuit, and a camera. The display screen has a display region and a non-display region. The camera is located in the non-display region.

The gravity sensor is configured to determine a usage status of the electronic device. The usage status is configured to indicate a gesture of the electronic device when the electronic device is held. The usage status includes a portrait-mode-upright usage status and a portrait-mode-inverted usage status. The non-display region is located at the top side of the display region when the electronic device is in the portrait-mode-upright usage status.

The control circuit is configured to determine a target zoom ratio of the camera when the electronic device is in the portrait-mode-inverted usage status.

The camera is configured to capture an image based on the target zoom ratio when the electronic device is in the portrait-mode-inverted usage status.

According to a second aspect of the implementations of the present disclosure, a capturing method is provided. The capturing method is applicable to an electronic device including a gravity sensor, a display screen, a control circuit, and a camera. The display screen has a display region and a non-display region. The camera is located in the non-display region. The method includes the follows.

A usage status of the electronic device is determined. The usage status is configured to indicate a gesture of the electronic device when the electronic device is held. The usage status includes a portrait-mode-upright usage status and a portrait-mode-inverted usage status. The non-display region is located at the top side of the display region when the electronic device is in the portrait-mode-upright usage status. A target zoom ratio of the camera is determined when the electronic device is in the portrait-mode-inverted usage status. An image is captured based on the target zoom ratio when the electronic device is in the portrait-mode-inverted usage status.

According to a third aspect of the implementations of the present disclosure, a capturing method is provided. The capturing method is applicable to an electronic device including a gravity sensor, a display screen, a control circuit, and a camera. The display screen has a display region and a non-display region. The camera is located in the non-display region. The method includes the follows.

The gravity sensor determines a usage status of the electronic device. The usage status is configured to indicate a gesture of the electronic device when the electronic device is held. The usage status includes a portrait-mode-upright usage status and a portrait-mode-inverted usage status. The non-display region is located at the top side of the display region when the electronic device is in the portrait-mode-upright usage status.

The control circuit determines a target zoom ratio of the camera when the electronic device is in the portrait-mode-inverted usage status.

The camera captures an image based on the target zoom ratio when the electronic device is in the portrait-mode-inverted usage status.

According to a fourth aspect of the implementations of the present disclosure, a capturing apparatus is provided. The capturing apparatus is applicable to an electronic device including a gravity sensor, a display screen, a control circuit, and a camera. The display screen has a display region and a non-display region. The camera is located in the non-display region. The capturing apparatus includes a first determining unit, a second determining unit, and a capturing unit.

The first determining unit is configured to determine a usage status of the electronic device. The usage status is configured to indicate a gesture of the electronic device when the electronic device is held. The usage status includes a portrait-mode-upright usage status and a portrait-mode-inverted usage status. The non-display region is located at the top side of the display region when the electronic device is in the portrait-mode-upright usage status.

The second determining unit is configured to determine a target zoom ratio of the camera when the electronic device is in the portrait-mode-inverted usage status.

The capturing unit is configured to capture an image based on the target zoom ratio when the electronic device is in the portrait-mode-inverted usage status.

According to a fifth aspect of the implementations of the disclosure, an electronic device is provided. The electronic device includes a processor and a memory configured to store executable program codes which, when executed, cause the processor to: determine a usage status of the electronic device, the usage status being configured to indicate a gesture of the electronic device when the electronic device is held, the usage status comprising a portrait-mode-upright usage status and a portrait-mode-inverted usage status, and a non-display region being located at the top side of a display region when the electronic device is in the portrait-mode-upright usage status; determine a target zoom ratio of a camera when the electronic device is in the portrait-mode-inverted usage status; capture an image based on the target zoom ratio when the electronic device is in the portrait-mode-inverted usage status.

According to a sixth aspect of the implementations of the disclosure, a non-transitory computer readable storage medium is provided. The non-transitory computer readable storage medium is configured to store a computer program which, when executed by a processor, causes the processor to carry out following actions: determining a usage status of an electronic device, the usage status being configured to indicate a gesture of the electronic device when the electronic device is held, the usage status comprising a portrait-mode-upright usage status and a portrait-mode-inverted usage status, and a non-display region being located at the top side of a display region when the electronic device is in the portrait-mode-upright usage status; determining a target zoom ratio of a camera when the electronic device is in the portrait-mode-inverted usage status; capturing an image based on the target zoom ratio when the electronic device is in the portrait-mode-inverted usage status.

According to a seventh aspect of the implementations of the disclosure, a computer program product is provided. The computer program product includes a non-transitory computer readable storage medium that stores computer programs. The computer programs are operable with a computer to perform all or part of the operations of any of the methods in the second aspect of the implementations of the disclosure. The computer program product may be a software installation package.

As can be seen, the capturing method provided in the implementations of the present disclosure is applicable to the electronic device. The electronic device includes the gravity sensor, the display screen, the control circuit, and the camera. The display screen has the display region and the non-display region. The camera is located in the non-display region. In the implementations of the present disclosure, the electronic device determines the usage status of the electronic device. The usage status is configured to indicate the gesture when the electronic device is held. The usage status includes the portrait-mode-upright usage status and the portrait-mode-inverted usage status. The non-display region is located at the top side of the display region when the electronic device is in the portrait-mode-upright usage status. Then, the electronic device determines the target zoom ratio of the camera when the electronic device is in the portrait-mode-inverted usage status. Thereafter, the electronic device captures the image based on the target zoom ratio when the electronic device is in the portrait-mode-inverted usage status. By means of the implementations of the present disclosure, the electronic device can capture subjects by adaptively matching a zoom ratio of the camera according to the usage status of the electronic device, thereby improving the capturing intelligence and the capturing effect.

The implementations of the present disclosure will be described in detail.

Figure 1:
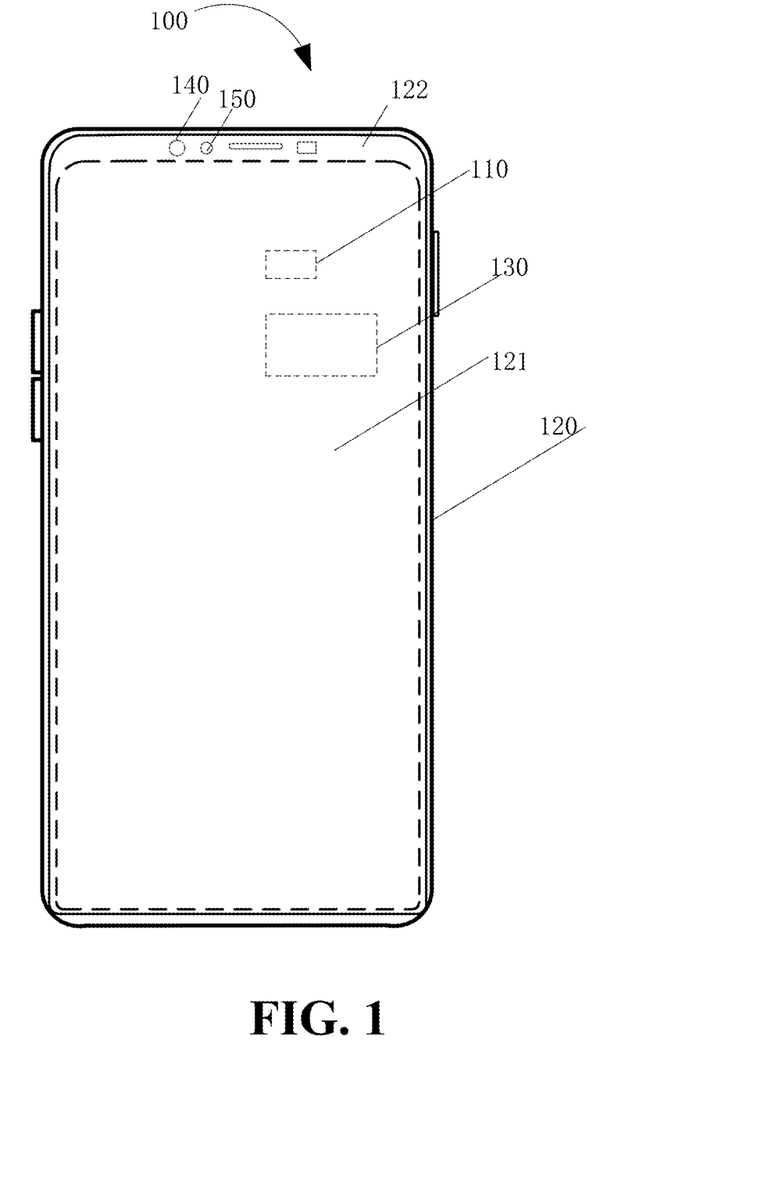
FIG. 1 is a schematic structure diagram illustrating an electronic device according to an implementation of the present disclosure.

FIG. 1 is a schematic structure diagram illustrating an electronic device 100 according to an implementation of the present disclosure. As illustrated in FIG. 1, the electronic device 100 includes a gravity sensor 110, a display screen 120, a control circuit 130, and a camera 140. The display screen 120 has a display region 121 and a non-display region 122. The camera 140 is located in the non-display region 122.

The gravity sensor 110 is configured to determine a usage status of the electronic device 100. The usage status is configured to indicate a gesture when the electronic device 100 is held. The usage status includes a portrait-mode-upright usage status and a portrait-mode-inverted usage status. The non-display region 122 is located at the top side of the display region 121 when the electronic device 100 is in the portrait-mode-upright usage status.

The control circuit 130 is configured to determine a target zoom ratio of the camera 140 when the electronic device 100 is in the portrait-mode-inverted usage status.

The camera 140 is configured to capture an image based on the target zoom ratio when the electronic device 100 is in the portrait-mode-inverted usage status.

The term "control circuit" may include an application processor and a memory. The application processor is a control center of the electronic device and is configured to connect various parts of the whole electronic device through various interfaces and lines, run or execute software programs and/or modules stored in the memory, and invoke data stored in the memory to perform various functions of the electronic device and process data, thereby monitoring the electronic device as a whole. In at least one implementation, the application processor may be just an application processor; alternatively, the application processor may also integrate a modem processor. The application processor is mainly configured to handle an operating system, a user interface, applications, and so on, and the modem processor is mainly configured to handle wireless communication. It should be understood that the above-mentioned modem processor may also not be integrated into the processor.

The memory is configured to store software programs and modules, and the application processor is configured to execute various function applications and data processing of the electronic device by running the software programs and modules stored in the memory. The memory may include a program storage area and a data storage area. The program storage area may store an operating system, application programs required for at least one function and so on. The data storage area may store data created according to use of the electronic device, and so on. In addition, the memory may include a high-speed random access memory (RAM), and may further include a non-volatile memory such as at least one disk storage device, a flash device, or other non-volatile solid storage devices.

As can be seen, the electronic device includes the gravity sensor, the display screen, the control circuit, and the camera. The display screen has the display region and the non-display region. The camera is located in the non-display region. In the implementation of the present disclosure, the gravity sensor of the electronic device determines the usage status of the electronic device. The usage status is configured to indicate the gesture when the electronic device is held. The usage status includes the portrait-mode-upright usage status and the portrait-mode-inverted usage status. The non-display region is located at the top side of the display region when the electronic device is in the portrait-mode-upright usage status. Then the control circuit of the electronic device determines the target zoom ratio of the camera when the electronic device is in the portrait-mode-inverted usage status. Thereafter, the camera of the electronic device captures the image based on the target zoom ratio when the electronic device is in the portrait-mode-inverted usage status. By means of the implementation of the present disclosure, the electronic device can capture subjects by adaptively matching a zoom ratio of the camera according to a usage status of the electronic device, thereby improving the capturing intelligence and the capturing effect.

As an implementation, the control circuit 130 configured to determine the target zoom ratio of the camera 140 is configured to determine a zoom ratio of the camera 140 as a first zoom ratio and acquire integrality of a first image captured by the camera 140 according to the first zoom ratio; to determine the zoom ratio of the camera 140 as a second zoom ratio when the integrality of the first image does not satisfy a preset condition, and acquire integrality of a second image captured by the camera 140 according to the second zoom ratio; to determine the second zoom ratio as the target zoom ratio when the integrality of the second image satisfies the preset condition.

As another implementation, the control circuit 130 configured to determine the target zoom ratio of the camera 140 is configured to acquire a target subject currently captured according to an image preview interface of the electronic device 100 and to determine the target zoom ratio corresponding to the target subject based on the target subject and a pre-stored correspondence between subjects and zoom ratios.

As an implementation, the control circuit 130 is further configured to acquire at least one pre-stored image, to classify the at least one pre-stored image according to at least one subject, to determine a zoom ratio corresponding to each subject according to at least one image corresponding to each subject, and to establish and store a correspondence between subjects and zoom ratios.

As an implementation, the electronic device 100 further includes a proximity sensor 150.

The proximity sensor 150 is configured to acquire a target capturing distance from the electronic device 100 to a subject.

The control circuit 130 configured to determine the target zoom ratio of the camera 140 is configured to determine the target zoom ratio corresponding to the target capturing distance based on the target capturing distance and a pre-stored correspondence between capturing distances and zoom ratios.

Figure 2A:
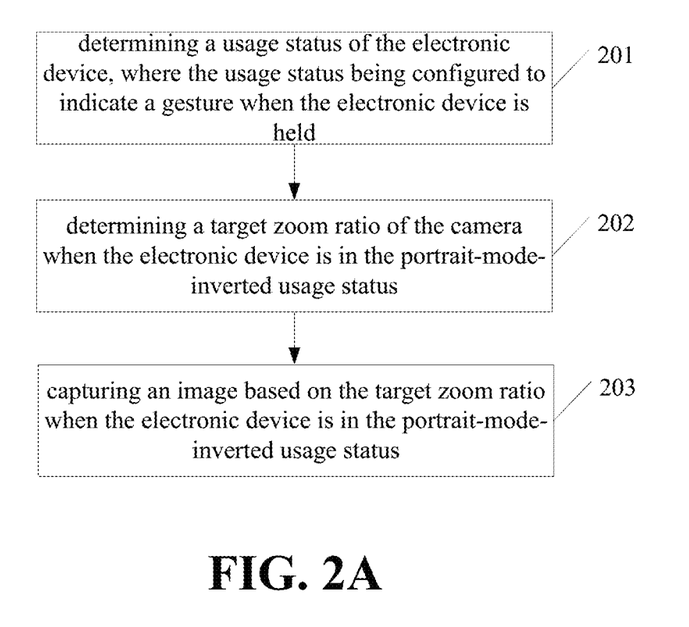
FIG. 2A is a schematic flow chart illustrating a capturing method according to an implementation of the present disclosure.

FIG. 2A is a schematic flow chart illustrating a capturing method according to an implementation of the present disclosure. The capturing method is applicable to an electronic device including a gravity sensor, a display screen, a control circuit, and a camera. The display screen has a display region and a non-display region. The camera is located in the non-display region. As illustrated in FIG. 2, the method begins at block 201.

At block 201, a usage status of the electronic device is determined. The usage status is configured to indicate a gesture of the electronic device when the electronic device is held. The usage status includes a portrait-mode-upright usage status and a portrait-mode-inverted usage status. The non-display region is located at the top side of the display region when the electronic device is in the portrait-mode-upright usage status.

The term "display region" referred to herein may include a touch screen and a display screen, and the display screen may include an organic light-emitting diode (OLED) display screen. The display region is configured for display.

The term "non-display region" referred to herein is configured to accommodate at least one function assembly. The at least one function assembly may include at least one of a front camera, a face recognition device, a proximity sensor, an ambient light sensor, etc.

Figure 2B:
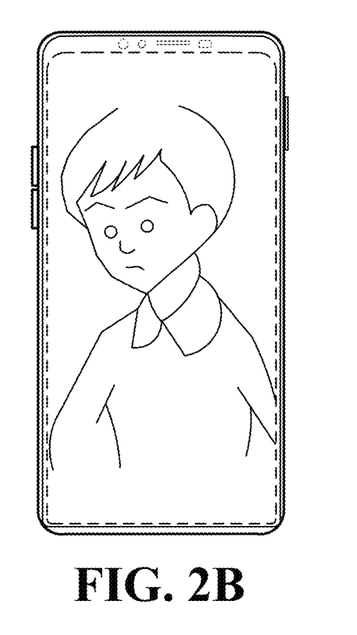
FIG. 2B is a schematic diagram of a capturing effect of an electronic device in a portrait-mode-upright usage status according to an implementation of the present disclosure.
Figure 2C:
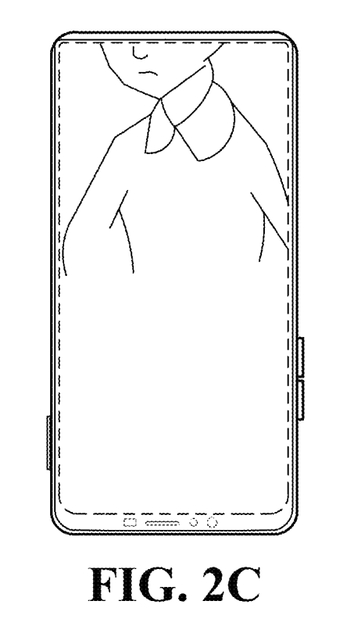
FIG. 2C is a schematic diagram of a capturing effect of an electronic device in a portrait-mode-inverted usage status according to an implementation of the present disclosure.

When the electronic device provided in the implementations of the present disclosure is in the portrait-mode-upright usage status, the non-display region is located at the top side of the display region. As illustrated in FIG. 1, since the camera is configured at one end of the electronic device, even though the distance from the electronic device to a subject keeps the same, images captured by the electronic device in the portrait-mode-upright usage status and in the portrait-mode-inverted usage status are different. When an image captured by the electronic device in the portrait-mode-upright usage status is complete (that is, integrated), an image captured by the electronic device in the portrait-mode-inverted usage status may be incomplete, as illustrated in FIG. 2B and FIG. 2C. As illustrated in FIG. 2B, the electronic device is in the portrait-mode-upright usage status. As illustrated in FIG. 2C, the electronic device is in the portrait-mode-inverted usage status. At this time, the electronic device can capture and obtain a complete image of the subject by reducing the zoom ratio of the camera.

In the implementation of the present disclosure, the usage status includes a portrait-mode-upright usage status and a portrait-mode-inverted usage status. In other implementations, the usage status includes a landscape-mode-upright usage status and a landscape-mode-inverted usage status, which is not limited herein. The non-display region is located at the left side of the display region when the electronic device is in the landscape-mode-upright usage status and the non-display region is located at the right side of the display region when the electronic device is in the landscape-mode-inverted usage status.

Figure 2D:
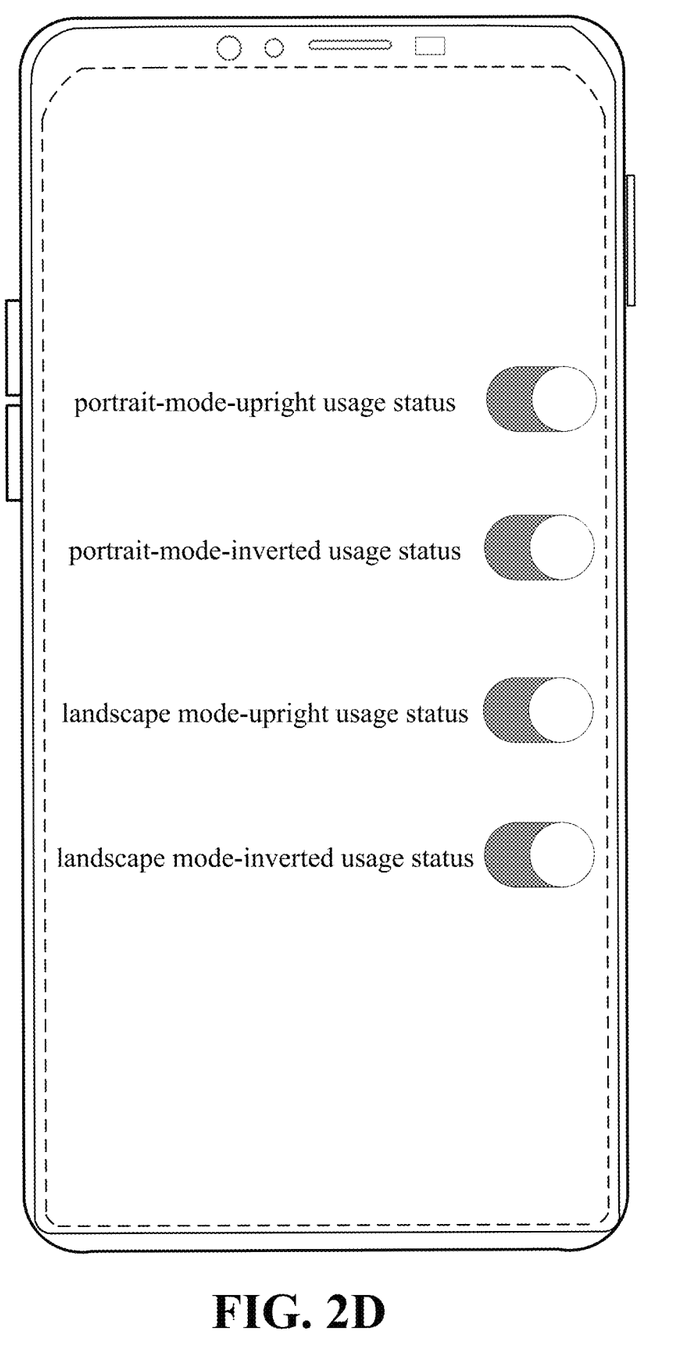
FIG. 2D is an effect schematic diagram of a human-machine interaction interface for selection operations of various usage status of an electronic device according to an implementation of the present disclosure.

As an implementation, the electronic device determines the usage status of the electronic device based on a selection operation of the user for each usage status of the electronic device. FIG. 2D illustrates a human-machine interaction interface for the selection operations of each usage status of the electronic device.

Figure 2E:
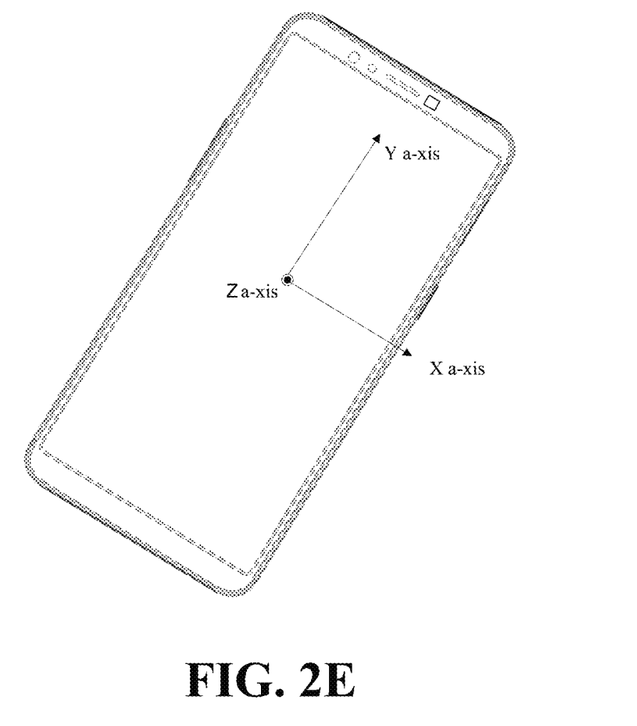
FIG. 2E is a schematic diagram of a principle of a three-axis gravity sensing chip according to an implementation of the present disclosure.

As an implementation, the electronic device determines the usage status of the electronic device by determining a gravitational acceleration in a length direction of the electronic device through a built-in three-axis gravity sensing chip. The specific principle is illustrated in FIG. 2E. The three-axis gravity sensing chip can measure gravitational accelerations of three directions (the X-axis direction, the Y-axis direction, and the Z-axis direction) respectively. The X-axis and the Y-axis are parallel to the plane of the electronic device. When the electronic device is in the portrait-mode-upright usage status or in the portrait-mode-inverted usage status, the X-axis direction is a width direction of the electronic device, the Y-axis direction is a length direction of electronic device, and the Z-axis direction is perpendicular to the plane of the electronic device.

For example, when the electronic device is in the portrait-mode-upright usage status, values of the gravitational accelerations in the three directions of the X-axis, the Y-axis, and the Z-axis are 0, −9.8, and 0, respectively. When the electronic device is in the portrait-mode-inverted usage status, values of the gravitational accelerations in the three directions of the X-axis, the Y-axis, and the Z-axis are 0, +9.8, and 0, respectively. When the electronic device is in the landscape-mode-upright usage status, values of the gravitational accelerations in the three directions of the X-axis, the Y-axis, and the Z-axis are −9.8, 0 and 0, respectively. When the electronic device is in the landscape-mode-inverted usage status, the gravitational acceleration values in the three directions of X-axis, Y-axis and Z-axis are +9.8, 0 and 0, respectively.

At block 202, a target zoom ratio of the camera is determined when the electronic device is in the portrait-mode-inverted usage status.

A zoom ratio of the camera is defined by the ratio of the size of the image obtained from a surface of the photosensitive member to the size of the subject, so that the zoom ratio is expressed in a ratio. The zoom ratio of the camera is also known as "image scale". For example, the camera can have an imaging effect of 1:1 or 1:2, and these ratios refer to the zoom ratio of the camera. The value on the left of the colon refers to the size of the image obtained from the surface of the photosensitive member, and the value on the right of the colon represents the size of the actual subject.

Specific implementations of determining the target zoom ratio of the camera by the electronic device may be various, which are not limited herein.

In one implementation, the electronic device determines the target zoom ratio based on detecting integrality of the subject in the image preview interface (for example, detecting integrality of the facial features).

In one implementation, the electronic device determines a corresponding target zoom ratio based on the distance from the electronic device to the subject. For example, when the electronic device is closer to the subject, the determined target zoom ratio (zoom-out ratio) is larger. When the electronic device is farther away from the subject, the determined target zoom ratio (zoom-out ratio) is smaller.

In one implementation, the electronic device determines the target zoom ratio according to the subject that the camera is capturing currently. The electronic devices can store a correspondence between at least one subject and zoom ratios corresponding to the at least one subject in advance.

At block 203, an image is captured based on the target zoom ratio when the electronic device is in the portrait-mode-inverted usage status.

As can be seen, the capturing method provided in the implementations of the present disclosure is applicable to the electronic device. The electronic device includes the gravity sensor, the display screen, the control circuit, and the camera. The display screen has the display region and the non-display region. The camera is located in the non-display region. In the implementations of the present disclosure, the electronic device determines the usage status of the electronic device. The usage status is configured to indicate the gesture when the electronic device is held. The usage status includes the portrait-mode-upright usage status and the portrait-mode-inverted usage status. The non-display region is located at the top side of the display region when the electronic device is in the portrait-mode-upright usage status. Then, the electronic device determines the target zoom ratio of the camera when the electronic device is in the portrait-mode-inverted usage status. Thereafter, the electronic device captures the image based on the target zoom ratio when the electronic device is in the portrait-mode-inverted usage status. By means of the implementations of the present disclosure, the electronic device can capture subjects by adaptively matching a zoom ratio of the camera according to a usage status of the electronic device, thereby improving the capturing intelligence and the capturing effect.

As an implementation, the target zoom ratio of the camera can be determined as follows.

A zoom ratio of the camera is determined as a first zoom ratio, and integrality of a first image captured by the camera according to the first zoom ratio is acquired. The zoom ratio of the camera is determined as a second zoom ratio when the integrality of the first image does not satisfy a preset condition, and integrality of a second image captured by the camera according to the second zoom ratio is acquired. The second zoom ratio is determined as the target zoom ratio when the integrality of the second image satisfies the preset condition.

As an implementation, the target zoom ratio of the camera can also be determined as follows.

A target subject currently captured is determined according to an image preview interface of the electronic device. The target zoom ratio corresponding to the target subject is determined based on the target subject and a pre-stored correspondence between subjects and zoom ratios.

As another implementation, when the number of the subjects determined by the electronic device according to the image preview interface of the electronic device is greater than one, the electronic device can first query whether each determined subject is stored in the electronic device in advance. When each determined subject is stored in the electronic device in advance, the electronic device determines the subject with the highest priority as the target subject that the electronic device is capturing based on the pre-stored priority of subjects. When there is any subject in the determined subjects that is not stored in the electronic device in advance, the electronic device may ignore the subject when determining the subjects.

The electronic device stores in advance at least one subject and zoom ratios corresponding to the at least one subject when the electronic device is in the portrait-mode-inverted usage status.

As an implementation, the electronic device further performs the following operations.

At least one pre-stored image is acquired. The at least one pre-stored image is classified according to at least one subject. A zoom ratio corresponding to each subject is determined according to at least one image corresponding to each subject. A correspondence between subjects and zoom ratios is established and stored.

As an implementation, the electronic device can acquire at least one image which is taken in advance, and further acquire at least one subject (that is, an identity of at least one subject) which is stored in advance. Then the electronic device classifies the at least one image into several groups and each group corresponds to a subject of the at least one subject. Thereafter the electronic device determines a zoom ratio of each group of images according to images in each group, and establishes a correspondence between each subject and zoom ratios.

As an implementation, the electronic device further acquires a target capturing distance from the electronic device to a subject.

The target zoom ratio of the camera can be determined as follows. The target zoom ratio corresponding to the target capturing distance is determined based on the target capturing distance and a pre-stored correspondence between capturing distances and zoom ratios.

Figure 3:
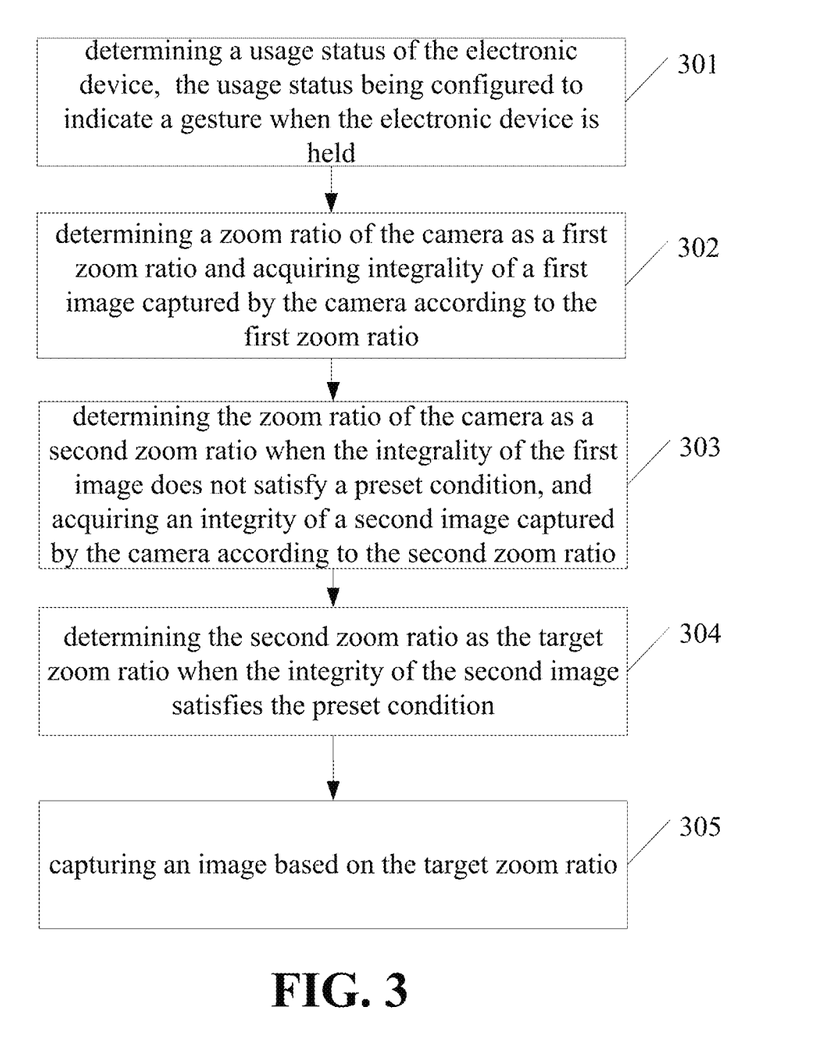
FIG. 3 is a schematic flow chart illustrating another capturing method according to an implementation of the present disclosure.

As illustrated in FIG. 3, FIG. 3 is a schematic flow chart illustrating a capturing method according to an implementation of the present disclosure. The capturing method is applicable to an electronic device including a gravity sensor, a display screen, a control circuit, and a camera. The display screen has a display region and a non-display region. The camera is located in the non-display region. The method begins at block 301.

At block 301, a usage status of the electronic device is determined. The usage status is configured to indicate a gesture of the electronic device when the electronic device is held. The usage status includes a portrait-mode-upright usage status and a portrait-mode-inverted usage status. The non-display region is located at the top side of the display region when the electronic device is in the portrait-mode-upright usage status.

At block 302, when the electronic device is in the portrait-mode-inverted usage status, a zoom ratio of the camera is determined as a first zoom ratio and integrality of a first image captured by the camera according to the first zoom ratio is acquired.

At block 303, the zoom ratio of the camera is determined as a second zoom ratio when the integrality of the first image does not satisfy a preset condition, and integrality of a second image captured by the camera according to the second zoom ratio is acquired.

At block 304, the second zoom ratio is determined as the target zoom ratio when the integrality of the second image satisfies the preset condition.

At block 305, an image is captured based on the target zoom ratio.

As can be seen, the capturing method provided in the implementations of the present disclosure is applicable to the electronic device. The electronic device includes the gravity sensor, the display screen, the control circuit, and the camera. The display screen has the display region and the non-display region. The camera is located in the non-display region. In the implementations of the present disclosure, the electronic device determines the usage status of the electronic device. The usage status is configured to indicate the gesture when the electronic device is held. The usage status includes the portrait-mode-upright usage status and the portrait-mode-inverted usage status. The non-display region is located at the top side of the display region when the electronic device is in the portrait-mode-upright usage status. Then, the electronic device determines the target zoom ratio of the camera when the electronic device is in the portrait-mode-inverted usage status. Thereafter, the electronic device captures the image based on the target zoom ratio when the electronic device is in the portrait-mode-inverted usage status. By means of the implementations of the present disclosure, the electronic device can capture subjects by adaptively matching a zoom ratio of the camera according to a usage status of the electronic device, thereby improving the capturing intelligence and the capturing effect.

Figure 4:
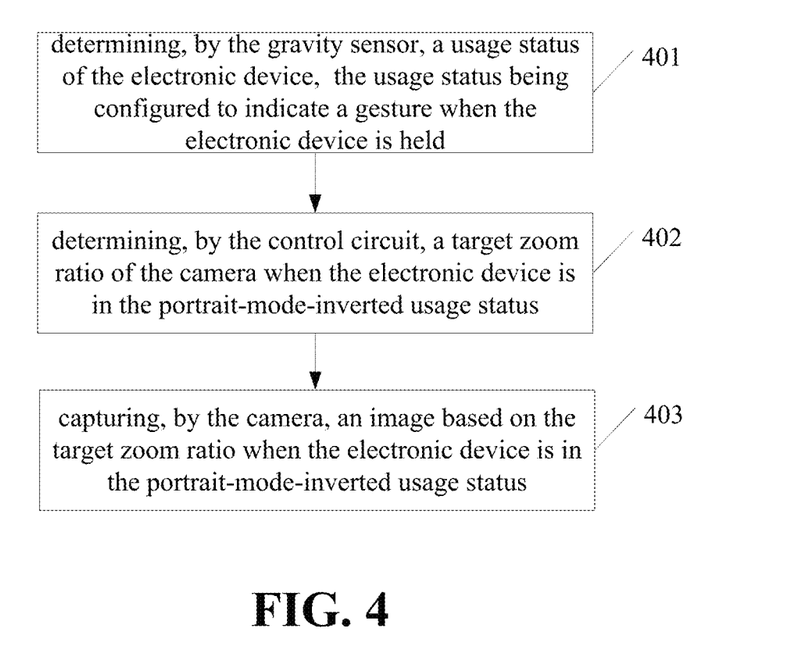
FIG. 4 is a schematic flow chart illustrating another capturing method according to an implementation of the present disclosure.

As illustrated in FIG. 4, FIG. 4 is a schematic flow chart illustrating a capturing method according to an implementation of the present disclosure. The capturing method is applicable to an electronic device including a gravity sensor, a display screen, a control circuit, and a camera. The display screen has a display region and a non-display region. The camera is located in the non-display region. The method begins at block 401.

At block 401, the gravity sensor determines a usage status of the electronic device. The usage status is configured to indicate a gesture of the electronic device when the electronic device is held. The usage status includes a portrait-mode-upright usage status and a portrait-mode-inverted usage status. The non-display region is located at the top side of the display region when the electronic device is in the portrait-mode-upright usage status.

At block 402, the control circuit determines a target zoom ratio of the camera when the electronic device is in the portrait-mode-inverted usage status.

At block 403, the camera captures an image based on the target zoom ratio when the electronic device is in the portrait-mode-inverted usage status.

As can be seen, the capturing method provided in the implementations of the present disclosure is applicable to the electronic device. The electronic device includes the gravity sensor, the display screen, the control circuit, and the camera. The display screen has the display region and the non-display region. The camera is located in the non-display region. In the implementations of the present disclosure, the electronic device determines the usage status of the electronic device. The usage status is configured to indicate the gesture when the electronic device is held. The usage status includes the portrait-mode-upright usage status and the portrait-mode-inverted usage status. The non-display region is located at the top side of the display region when the electronic device is in the portrait-mode-upright usage status. Then, the electronic device determines the target zoom ratio of the camera when the electronic device is in the portrait-mode-inverted usage status. Thereafter, the electronic device captures the image based on the target zoom ratio when the electronic device is in the portrait-mode-inverted usage status. By means of the implementations of the present disclosure, the electronic device can capture subjects by adaptively matching a zoom ratio of the camera according to a usage status of the electronic device, thereby improving the capturing intelligence and the capturing effect.

As an implementation, the control circuit determines the target zoom ratio of the camera as follows.

The control circuit determines a zoom ratio of the camera as a first zoom ratio and acquires integrality of a first image captured by the camera according to the first zoom ratio.

The control circuit determines the zoom ratio of the camera as a second zoom ratio when the integrality of the first image does not satisfy a preset condition, and acquires integrality of a second image captured by the camera according to the second zoom ratio.

The control circuit determines the second zoom ratio as the target zoom ratio when the integrality of the second image satisfies the preset condition.

As an implementation, the control circuit determines the target zoom ratio of the camera as follows.

The control circuit acquires a target subject currently captured according to an image preview interface of the electronic device.

The control circuit determines the target zoom ratio corresponding to the target subject based on the target subject and a pre-stored correspondence between subjects and zoom ratios.

As an implementation, the control circuit can further perform following operations.

The control circuit acquires at least one pre-stored image.

The control circuit classifies the at least one pre-stored image according to at least one subject.

The control circuit determines a zoom ratio corresponding to each subject according to at least one image corresponding to each subject.

The control circuit establishes and stores a correspondence between subjects and zoom ratios.

As an implementation, the electronic device further includes a proximity sensor. The method further includes the follows.

The proximity sensor acquires a target capturing distance from the electronic device to a subject.

The control circuit determines the target zoom ratio of the camera as follows.

The control circuit determines the target zoom ratio corresponding to the target capturing distance based on the target capturing distance and a pre-stored correspondence between capturing distances and zoom ratios.

Figure 5A:
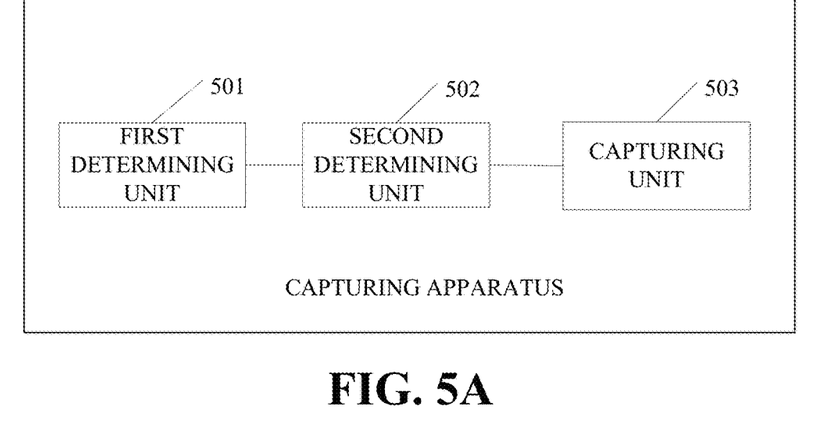
FIG. 5A is a block diagram illustrating units of a capturing apparatus according to an implementation of the present disclosure.

The followings are apparatus implementations of the present disclosure. The apparatus implementations of the present disclosure are configured to implement the method implemented by the method implementations of the present disclosure. A capturing apparatus is provided. The capturing apparatus is applicable to an electronic device. The electronic device includes a gravity sensor, a display screen, a control circuit, and a camera. The display screen has a display region and a non-display region. The camera is located in the non-display region. FIG. 5A is a block diagram illustrating units of a capturing apparatus according to an implementation of the present disclosure. As illustrated in FIG. 5A, the capturing apparatus includes a first determining unit 501, a second determining unit 502, and a capturing unit 503.

The first determining unit 501 is configured to determine a usage status of the electronic device. The usage status is configured to indicate a gesture of the electronic device when the electronic device is held. The usage status includes a portrait-mode-upright usage status and a portrait-mode-inverted usage status. The non-display region is located at the top side of the display region when the electronic device is in the portrait-mode-upright usage status.

The second determining unit 502 is configured to determine a target zoom ratio of the camera when the electronic device is in the portrait-mode-inverted usage status.

The capturing unit 503 is configured to capture an image based on the target zoom ratio when the electronic device is in the portrait-mode-inverted usage status.

Figure 5B:
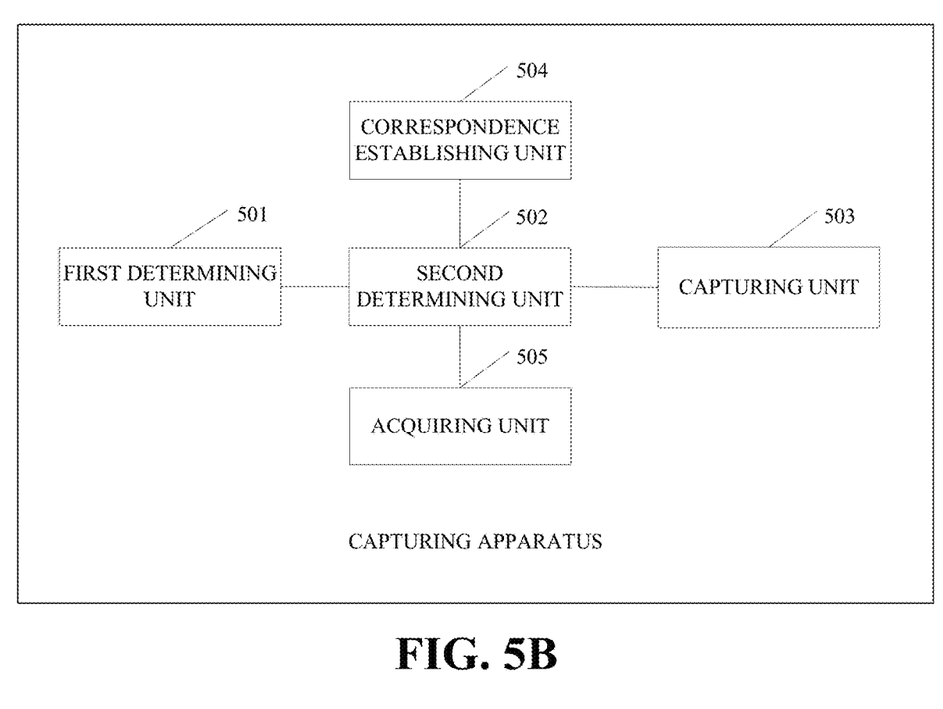
FIG. 5B is a block diagram illustrating units of another capturing apparatus according to an implementation of the present disclosure.

FIG. 5B is a block diagram illustrating units of another capturing apparatus according to an implementation of the present disclosure. As illustrated in FIG. 5B, the apparatus includes the first determining unit 501, the second determining unit 502, and the capturing unit 503 of the capturing apparatus as illustrated in FIG. 5A.

As an implementation, the second determining unit 502 is configured to determine a zoom ratio of the camera as a first zoom ratio and acquire integrality of a first image captured by the camera according to the first zoom ratio, to determine the zoom ratio of the camera as a second zoom ratio when the integrality of the first image does not satisfy a preset condition, and acquire integrality of a second image captured by the camera according to the second zoom ratio, and to determine the second zoom ratio as the target zoom ratio when the integrality of the second image satisfies the preset condition.

As an implementation, the second determining unit 502 is configured to acquire a target subject currently captured according to an image preview interface of the electronic device, and to determine the target zoom ratio corresponding to the target subject based on the target subject and a pre-stored correspondence between subjects and zoom ratios.

As an implementation, the capturing apparatus further includes a correspondence establishing unit 504.

The correspondence establishing unit 504 is configured to acquire at least one pre-stored image, to classify the at least one pre-stored image according to at least one subject, to determine a zoom ratio corresponding to each subject according to at least one image corresponding to each subject, and to establish and store a correspondence between subjects and zoom ratios.

As an implementation, the capturing apparatus further includes an acquiring unit 505.

The acquiring unit 505 is configured to acquire a target capturing distance from the electronic device to a subject.

The second determining unit 502 is configured to determine the target zoom ratio corresponding to the target capturing distance based on the target capturing distance and a pre-stored correspondence between capturing distances and zoom ratios.

Specific implementations of the foregoing various units can refer to descriptions of related steps in the corresponding implementations as illustrated in FIG. 2A to FIG. 4, which are not described in detail herein.

It is to be noted that, the capturing apparatus described in the apparatus implementations of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

As can be seen, the capturing apparatus provided in the implementations of the present disclosure is applicable to the electronic device. The electronic device includes the gravity sensor, the display screen, the control circuit, and the camera. The display screen has the display region and the non-display region. The camera is located in the non-display region. In the implementations of the present disclosure, the electronic device determines the usage status of the electronic device. The usage status is configured to indicate the gesture when the electronic device is held. The usage status includes the portrait-mode-upright usage status and the portrait-mode-inverted usage status. The non-display region is located at the top side of the display region when the electronic device is in the portrait-mode-upright usage status. Then, the electronic device determines the target zoom ratio of the camera when the electronic device is in the portrait-mode-inverted usage status. Thereafter, the electronic device captures the image based on the target zoom ratio when the electronic device is in the portrait-mode-inverted usage status. By means of the implementations of the present disclosure, the electronic device can capture subjects by adaptively matching a zoom ratio of the camera according to a usage status of the electronic device, thereby improving the capturing intelligence and the capturing effect.

Figure 6:
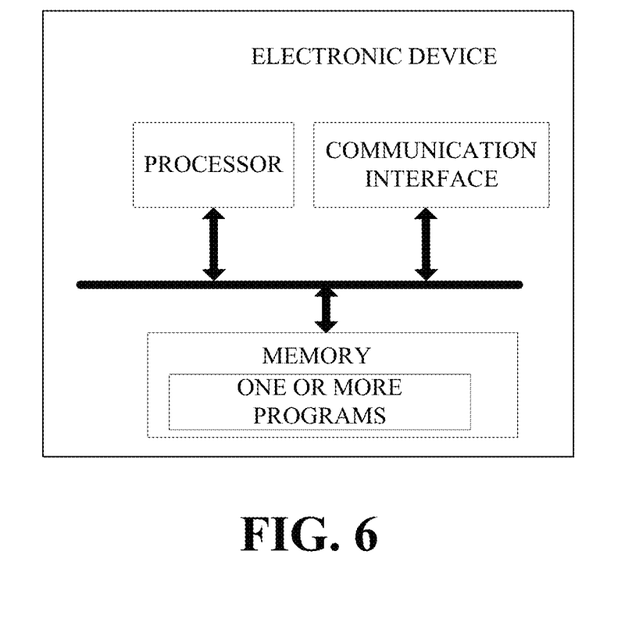
FIG. 6 is a block diagram illustrating units of an electronic device according to an implementation of the present disclosure.

Consistent with the implementations illustrated in FIG. 2A to FIG. 4, FIG. 6 is a block diagram illustrating units of an electronic device according to an implementation of the present disclosure. As illustrated in FIG. 6, the electronic device includes a processor, a memory, and a communication interface. The memory is configured to store one or more programs. The one or more programs are configured to be executed by the processor and include instructions operable to execute the following operations.

A usage status of the electronic device is determined. The usage status is configured to indicate a gesture of the electronic device when the electronic device is held. The usage status includes a portrait-mode-upright usage status and a portrait-mode-inverted usage status. A non-display region is located at the top side of a display region when the electronic device is in the portrait-mode-upright usage status. A target zoom ratio of a camera is determined when the electronic device is in the portrait-mode-inverted usage status. An image is captured based on the target zoom ratio when the electronic device is in the portrait-mode-inverted usage status.

As one implementation, in terms of determining the target zoom ratio of the camera, the instructions of the programs are operable to execute the following.

A zoom ratio of the camera is determined as a first zoom ratio and integrality of a first image captured by the camera according to the first zoom ratio is acquired. The zoom ratio of the camera is determined as a second zoom ratio when the integrality of the first image does not satisfy a preset condition, and integrality of a second image captured by the camera according to the second zoom ratio is acquired. The second zoom ratio is determined as the target zoom ratio when the integrality of the second image satisfies the preset condition.

As one implementation, in terms of determining the target zoom ratio of the camera, the instructions of the programs are operable to execute the following.

A target subject currently captured is acquired according to an image preview interface of the electronic device. The target zoom ratio corresponding to the target subject is determined based on the target subject and a pre-stored correspondence between subjects and zoom ratios.

As one implementation, the programs further include instructions operable to execute the following operations.

At least one pre-stored image is acquired. The at least one pre-stored image is classified according to at least one subject. A zoom ratio corresponding to each subject is determined according to at least one image corresponding to each subject. A correspondence between subjects and zoom ratios is established and stored.

As one implementation, the programs further include instructions operable to execute the following operations.

A target capturing distance from the electronic device to a subject is acquired.

In terms of determining the target zoom ratio of the camera, the instructions of the programs are operable to execute the following.

The target zoom ratio corresponding to the target capturing distance is determined based on the target capturing distance and a pre-stored correspondence between capturing distances and zoom ratios.

As can be seen, the electronic device provided in the implementations of the present disclosure includes the gravity sensor, the display screen, the control circuit, and the camera. The display screen has the display region and the non-display region. The camera is located in the non-display region. In the implementations of the present disclosure, the electronic device determines the usage status of the electronic device. The usage status is configured to indicate the gesture when the electronic device is held. The usage status includes the portrait-mode-upright usage status and the portrait-mode-inverted usage status. The non-display region is located at the top side of the display region when the electronic device is in the portrait-mode-upright usage status. Then, the electronic device determines the target zoom ratio of the camera when the electronic device is in the portrait-mode-inverted usage status. Thereafter, the electronic device captures the image based on the target zoom ratio when the electronic device is in the portrait-mode-inverted usage status. By means of the implementations of the present disclosure, the electronic device can capture subjects by adaptively matching a zoom ratio of the camera according to a usage status of the electronic device, thereby improving the capturing intelligence and the capturing effect.

Implementations of the present disclosure also provide a non-transitory computer readable storage medium. The non-transitory computer readable storage medium is configured to store a computer program which, when executed by a processor, causes the processor to carry out all or part of the operations of any of the methods described in the above-described method implementations.

Implementations of the present disclosure also provide a computer program product. The computer program product includes a non-transitory computer readable storage medium that stores computer programs. The computer programs are operable with a computer to perform all or part of the operations of any of the methods described in the above method implementations.

It is to be noted that, for the sake of simplicity, the foregoing method implementations are described as a series of action combinations. However, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative. For instance, the division of the unit is only a logical function division and there can be other manners of division during actual implementations, and for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, and the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on)

to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

The implementations of the present disclosure are described in detail above, and specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A method of capturing based on a usage status of an electronic device, applicable to the electronic device comprising a gravity sensor, a display screen, a control circuit, and a camera, the display screen having a display region and a non-display region, the camera being located in the non-display region, the method comprising:
   determining the usage status of the electronic device, the usage status being configured to indicate a gesture of the electronic device when the electronic device is held, the usage status comprising a portrait-mode-upright usage status and a portrait-mode-inverted usage status, the non-display region where the camera is located being located at the top side of the display region when the electronic device is in the portrait-mode-upright usage status, and the non-display region where the camera is located being located at the bottom side of the display region when the electronic device is in the portrait-mode-inverted usage status;
   determining a target zoom ratio of the camera when the electronic device is in the portrait-mode-inverted usage status; and
   capturing an image based on the target zoom ratio when the electronic device is in the portrait-mode-inverted usage status.

2. The method of claim 1, wherein determining the usage status of the electronic device comprises:
   determining the usage status of the electronic device based on a selection operation for each usage status of the electronic device.

3. The method of claim 1, wherein determining the usage status of the electronic device comprises:
   determining the usage status of the electronic device by determining a gravitational acceleration in a length direction of the electronic device through a built-in three-axis gravity sensing chip.

4. The method of claim 1, wherein determining the target zoom ratio of the camera comprises:
   determining a zoom ratio of the camera as a first zoom ratio and acquiring integrality of a first image captured by the camera according to the first zoom ratio;
   determining the zoom ratio of the camera as a second zoom ratio when the integrality of the first image does not satisfy a preset condition, and acquiring integrality of a second image captured by the camera according to the second zoom ratio; and
   determining the second zoom ratio as the target zoom ratio when the integrality of the second image satisfies the preset condition.

5. The method of claim 1, wherein determining the target zoom ratio of the camera comprises:
   acquiring a target subject currently captured according to an image preview interface of the electronic device; and
   determining the target zoom ratio corresponding to the target subject based on the target subject and a pre-stored correspondence between subjects and zoom ratios.

6. The method of claim 5, wherein acquiring the target subject currently captured according to the image preview interface of the electronic device comprises:
   querying whether each determined subject is stored in the electronic device in advance, when the number of subjects determined by the electronic device according to the image preview interface of the electronic device is greater than one; and
   determining the subject with the highest priority as the target subject that the electronic device is capturing based on a pre-stored priority of subjects when each determined subject is stored in the electronic device in advance.

7. The method of claim 5, further comprising:
   acquiring at least one pre-stored image;
   classifying the at least one pre-stored image according to at least one subject;
   determining a zoom ratio corresponding to each subject according to at least one image corresponding to each subject; and
   establishing and store a correspondence between subjects and zoom ratios.

8. The method of claim 1, further comprising:
   acquiring a target capturing distance from the electronic device to a subject,
   wherein determining the target zoom ratio of the camera comprises:
   determining the target zoom ratio corresponding to the target capturing distance based on the target capturing distance and a pre-stored correspondence between capturing distances and zoom ratios.

9. An electronic device, comprising:
   a processor; and
   a memory configured to store executable program codes which, when executed, cause the processor to:
      determine a usage status of the electronic device, the usage status being configured to indicate a gesture of the electronic device when the electronic device is held, the usage status comprising a portrait-mode-upright usage status and a portrait-mode-inverted usage status, and a non-display region being located at the top side of a display region when the electronic device is in the portrait-mode-upright usage status;
      determine a target zoom ratio of a camera when the electronic device is in the portrait-mode-inverted usage status; and
      capture an image based on the target zoom ratio when the electronic device is in the portrait-mode-inverted usage status;

wherein the executable program codes causing the processor to determine the target zoom ratio of the camera cause the processor to:
  determine a zoom ratio of the camera as a first zoom ratio and acquiring integrality of a first image captured by the camera according to the first zoom ratio; determine the zoom ratio of the camera as a second zoom ratio when the integrality of the first image does not satisfy a preset condition, and acquire integrality of a second image captured by the camera according to the second zoom ratio; and determine the second zoom ratio as the target zoom ratio when the integrality of the second image satisfies the preset condition;
  acquire at least one pre-stored image; classify the at least one pre-stored image according to at least one subject determine a zoom ratio corresponding to each subject according to at least one image corresponding to each subject establish and store a correspondence between subjects and zoom ratios; acquire a target subject currently captured according to an image preview interface of the electronic device; and determine the target zoom ratio corresponding to the target subject based on the target subject and the pre-stored correspondence between subjects and zoom ratios; or
  acquire a target capturing distance from the electronic device to a subject and determine the target zoom ratio corresponding to the target capturing distance based on the target capturing distance and a pre-stored correspondence between capturing distances and zoom ratios.

10. The electronic device of claim 9, wherein the executable program codes causing the processor to determine the usage status of the electronic device cause the processor to:
  determine the usage status of the electronic device based on a selection operation for each usage status of the electronic device.

11. The electronic device of claim 9, wherein the executable program codes causing the processor to determine the usage status of the electronic device cause the processor to:
  determine the usage status of the electronic device by determining a gravitational acceleration in a length direction of the electronic device through a built-in three-axis gravity sensing chip.

12. A non-transitory computer readable storage medium storing a computer program which, when executed by a processor, causes the processor to:
  determine a usage status of an electronic device, the usage status being configured to indicate a gesture of the electronic device when the electronic device is held, the usage status comprising a portrait-mode-upright usage status and a portrait-mode-inverted usage status, and a non-display region being located at the top side of a display region when the electronic device is in the portrait-mode-upright usage status;
  determine a target zoom ratio of a camera when the electronic device is in the portrait-mode-inverted usage status; and
  capture an image based on the target zoom ratio when the electronic device is in the portrait-mode-inverted usage status;
wherein the computer program executed by the processor to determine the target zoom ratio of the camera is executed by the processor to:
  determine a zoom ratio of the camera as a first zoom ratio and acquiring integrality of a first image captured by the camera according to the first zoom ratio; determine the zoom ratio of the camera as a second zoom ratio when the integrality of the first image does not satisfy a preset condition, and acquiring integrality of a second image captured by the camera according to the second zoom ratio; and determine the second zoom ratio as the target zoom ratio when the integrality of the second image satisfies the preset condition; or
  acquire at least one pre-stored image; classify the at least one pre-stored image according to at least one subject determine a zoom ratio corresponding to each subject according to at least one image corresponding to each subject establish and store a correspondence between subjects and zoom ratios; acquire a target subject currently captured according to an image preview interface of the electronic device; and determine the target zoom ratio corresponding to the target subject based on the target subject and a pre-stored correspondence between subjects and zoom ratios.

* * * * *